Patented Apr. 26, 1927.

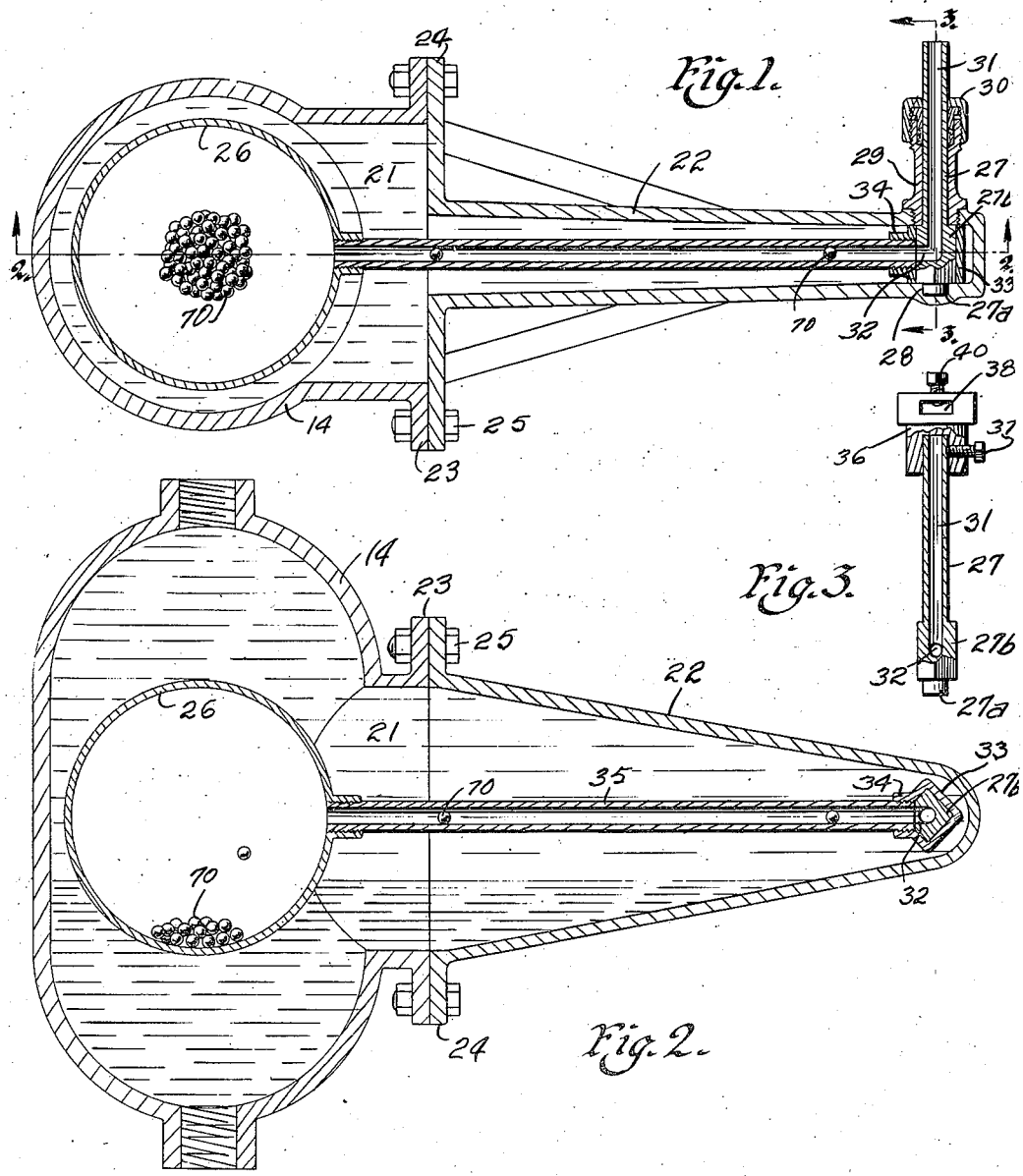

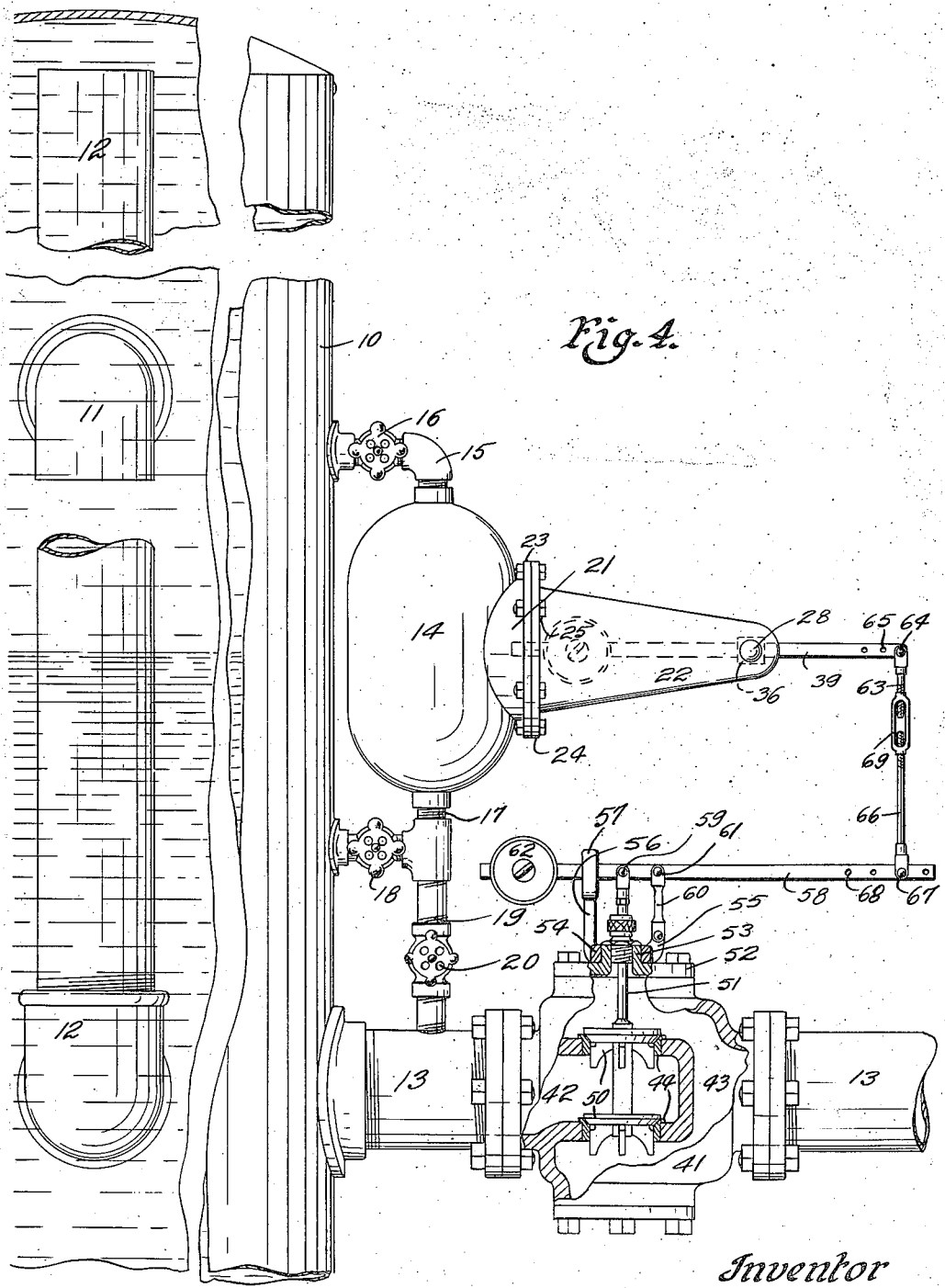

1,626,504

UNITED STATES PATENT OFFICE.

LYLE W. BROWNE, OF MARSHALLTOWN, IOWA, ASSIGNOR TO THE FISHER GOVERNOR COMPANY, OF MARSHALLTOWN, IOWA.

FLOAT CONTROL DEVICE.

Application filed January 21, 1925. Serial No. 3,766.

The object of my invention is to provide a float control device of simple construction in a liquid separator.

More particularly, it is my purpose to provide a float for operating the valve in a pipe line connected with the container of a liquid separator according to the height of the heavier liquid. The float is pivotally mounted and is of the hollow ball type and the structure is provided with means whereby the weight of the float may be accurately varied, so that it will rise or drop according to the level of the heavier liquid and will not float upwardly in the lighter liquid.

With these and other objects in view, my invention consists in the construction, arrangement and combination of the various parts of my float device, whereby the objects contemplated are attained, as hereinafter more fully set forth, pointed out in my claim, and illustrated in the accompanying drawings, in which:

Figure 1 shows a horizontal sectional view through a float cage and float mounting structure illustrating my invention.

Figure 2 is a vertical, sectional view through the same.

Figure 3 is a detail view partly in section of the shaft for the float arm; and

Figure 4 is a vertical, sectional view of a tank on which the float structure is installed, the controlling structure being also shown partly in section and partly broken away.

It is known that in the production of crude oils for example, it frequently occurs that the oil comes from a flowing well having considerable water mixed with it.

It is necessary that the water and oil be immediately separated so that the oil may be fed to a pipe line and the water discharged.

It is necessary that water be kept from the pipe line by which the oil is conducted to the refinery and it is of course important that no oil be wasted.

Crude oil with water for instance mixed therewith may be supplied to the tank 10 through the pipe 11. Oil may be discharged from the tank through the pipe 12 and water may be discharged from the tank through the pipe 13.

It is obvious that if the water can be maintained in the tank at a predetermined level the proper separation of the water and oil may be accomplished.

Maintaining the water level, however, is a somewhat difficult problem in view of the fact that in different wells the proportion of oil and water coming from the well may vary considerably, and even in the same well, the proportion of oil and water may vary at different times.

It is obvious that the oil will flow out of the tank 10 whenever it reaches the top of the oil outlet pipe 12. Therefore if water can be maintained at a predetermined level under the oil and allowed to flow away whenever it gets above that level and restricted in its flow when it gets below the level, the separation can be accomplished.

There is, however, some difficulty in providing a simple float structure which will be effected by the rising and lowering of the water level and will not float too high in the oil.

I have therefore devised a float structure of the kind in which a hollow ball float can be readily varied in weight so that it will float at the top of the water in the water and oil.

I have provided in connection with the tank 10 and on the exterior thereof at a height corresponding to the water level which it is desired to maintain a float cage 14, formed of a hollow casting.

The upper end of the float cage is supported on the tank 10 by means of a pipe 15, which also provides communication between the interior of the tank and the interior of the float cage. A controlling valve 16 may be arranged in the pipe 15.

The lower end of the float cage is supported on the tank 10 by means of a pipe 17, which affords communication between the tank and the float cage. Flow through the pipe 17 is controlled by a valve 18.

Where there may be sand or sediment in the oil or other liquid, it may be desirable to connect the float cage 14 at its lower end with the discharge pipe 13 by means of a pipe 19 in order to permit sediment to drop by gravity in a straight line to the discharge pipe line. Where the pipe 19 is employed, a control valve 20 is placed therein.

The cage 14 has an opening 21 at one side thereof. A member 22 having a hollow cone shape is provided for receiving the float arm hereinafter mentioned and is closed at its outer smaller end. The cage 14 and the float arm receiving member 22 are provided with coacting flanges 23 and 24, whereby the member 22 may be connected with the float cage by bolts 25 with the larger end opening directly into the float cage.

In the float cage is a hollow copper ball float 26.

Rotatably mounted in the outer end of the member 22 is a shaft 27, one end 27$^a$ of which is rotatably received in a socket 28 on the interior of the member 22, as shown in Figure 1.

The shaft 27 projects through the opposite side wall of the member 22 through a stuffing sleeve 29 on which is a stuffing cap 30. The portion of the shaft within the member 22 is angular in cross section at 27$^b$.

The shaft is provided with a passage 31 extending from its outer end longitudinally thereof to a point about midway of the length of the angular portion 27$^b$ where it communicates with a laterally extending passage 32 shown in Figures 1 and 3.

On the angular portion 27$^b$ of the shaft 27 is mounted a fitting 33 having an opening extended therethrough to fit the shaft portion 27$^b$ and having formed thereon a socket 34 into which is screwed a tubular float arm 35, which thus communicates with the passage 32 and the passage 31.

The arm 35 has a screw-threaded connection with the float 26 in such manner that the hole in the tubular arm 35 communicates with the interior of the hollow float.

On the outer end of the shaft 27 is adjustably fixed a fitting 36 by means of a set screw 37. In the fitting 36 is a hole 38 which receives a lever 39. The lever 39 may be locked in various adjusted positions in the fitting 36 by means of a set screw 40.

Arranged in the discharge line 13 is a valve structure having the valve casing or body 41 provided with the inlet opening 42 and the outlet opening 43 and valve seats 44 and the valves 50 arranged on a common stem 51.

The valve body has a cover 52 removably bolted thereto. The stem 51 extends through the valve body cover 52. The cover 52 has an upward extension 53 on which is mounted a collar 54 having an arm 55 on one side and an upwardly projecting arm 56 on the other side terminating in the bifurcated ends or arm members 57.

A valve lever 58 is pivoted to the valve stem by means of a removable pin 59. A link 60 is pivoted to the arm 55 and by means of a detachable pin 61 to the lever 58. The arms 57 serve as guides for the lever 58. On the lever I preferably use an adjustable counterbalance weight 62.

The levers 39 and 58 are adjustably connected by the following means: A turn buckle rod 63 is adjustably pivoted to the lever 39 by means of a pin 64 selectively received in one of a series of holes 65 in the lever 39. Similarly a turn buckle rod 66 is adjustably pivoted to the lever 58 by means of a pin 67 selectively received in one of a series of holes 68 in the lever 58.

The rods 63 and 66 have right and left hand screw threads and are adjustably connected by a turn buckle 69.

The collar 54 may be adjustably held on the extension 53 by means of a set screw extended through the collar and engaging the extension 53.

It will be seen that as the float 26 rises or lowers the shaft 27 will be rotated for locking or tilting the lever 39 and the lever 58 for thus actuating the valves 50.

In order to insure that the float 26 will rise and fall with the water level while in the oil, shot may be poured into the float before it is installed through the hollow shaft 27 and the hollow arm 35.

By determining the specific gravity of the oil in comparison with that of the water, the float may thus be accurately weighted to float on the water and to remain immersed in the oil.

Ordinarily it is only necessary to put in the proper amount of shot and no change need thereafter be made. If the oil in one section of the country varies slightly in specific gravity from that in another section, the number and weight of shot in the float may be changed to suit the conditions.

By taking the float cage off, any number of shot may be removed from the float.

It will, of course, be understood that the amount of oil standing above the water level line is fixed by the height of the outlet, so that it is not dfficult to determine what weight of shot should be placed in the float.

By using the float thus weighted, it will maintain the water level and there will thus remain a fixed column of oil above the water. The water will be allowed to flow away whenever its level rises, and I have thus provided an effective separator for the oil and water, which will operate regardless of variations in the proportions of oil and water supplied to the tank 10.

The separator may be readily adjusted for liquids of different specific gravities by putting in more shot or taking out some of the shot.

I claim as my invention:

In a device of the class described, a float cage, a hollow float therein, a tubular float arm connected with said float, a hollow pivot member supported on the wall of the cage and projecting therethrough at right angles to the said arm having its interior arranged in communication with the interior of said arm, and means for connecting said pivot member at a point outside the cage with an operative mechanism, such as a valve, said last means including a fitting mounted on the outer end of said pivot member for closing the end thereof, means for fixing said fitting on the pivot member, and an arm mounted on said fitting.

LYLE W. BROWNE.